US008558167B2

(12) United States Patent
Wright

(10) Patent No.: US 8,558,167 B2
(45) Date of Patent: Oct. 15, 2013

(54) MICROENGINEERED MULTIPOLE ROD ASSEMBLY

(75) Inventor: Steven Wright, Horsham (GB)

(73) Assignee: Microsaic Systems PLC, Woking, Surrey (GB)

( * ) Notice: Subject to any disclaimer, the term of this patent is extended or adjusted under 35 U.S.C. 154(b) by 52 days.

(21) Appl. No.: 13/053,463

(22) Filed: Mar. 22, 2011

(65) Prior Publication Data

US 2011/0240849 A1 Oct. 6, 2011

(30) Foreign Application Priority Data

Apr. 1, 2010 (GB) .............................. GB1005549.9

(51) Int. Cl.
*B01D 59/44* (2006.01)

(52) U.S. Cl.
USPC .......................................... 250/283; 250/281

(58) Field of Classification Search
None
See application file for complete search history.

(56) References Cited

U.S. PATENT DOCUMENTS

| | | | | |
|---|---|---|---|---|
| 4,290,061 | A * | 9/1981 | Serrano | 345/174 |
| 4,700,069 | A | 10/1987 | Ino et al. | |
| 5,572,035 | A * | 11/1996 | Franzen | 250/396 R |
| 5,574,561 | A * | 11/1996 | Boudreau et al. | 356/399 |
| 5,719,393 | A * | 2/1998 | Chutjian et al. | 250/292 |
| 5,852,294 | A * | 12/1998 | Gulcicek et al. | 250/292 |
| 5,857,890 | A | 1/1999 | Ferran | |
| 5,939,718 | A | 8/1999 | Yamada et al. | |
| 6,025,591 | A | 2/2000 | Taylor et al. | |
| 6,107,745 | A * | 8/2000 | Mougin et al. | 315/169.1 |
| 6,329,654 | B1 * | 12/2001 | Gulcicek et al. | 250/293 |
| 6,441,370 | B1 * | 8/2002 | Khosla et al. | 250/292 |
| 6,639,234 | B1 * | 10/2003 | Badura et al. | 250/492.3 |
| 6,759,651 | B1 * | 7/2004 | Li | 250/288 |
| 6,926,783 | B2 * | 8/2005 | Loucks, Jr. | 156/73.6 |
| 6,972,406 | B2 * | 12/2005 | Syms | 250/281 |
| 7,176,455 | B1 * | 2/2007 | Whitehouse et al. | 250/288 |
| 7,351,963 | B2 * | 4/2008 | Rebettge et al. | 250/292 |
| 7,667,193 | B2 | 2/2010 | Finlay | |
| 7,786,434 | B2 | 8/2010 | Syms et al. | |
| 2002/0005479 | A1 * | 1/2002 | Yoshinari et al. | 250/288 |
| 2003/0075790 | A1 * | 4/2003 | Steinberg et al. | 257/686 |
| 2003/0173515 | A1 * | 9/2003 | Tong | 250/292 |

(Continued)

FOREIGN PATENT DOCUMENTS

GB 1468139 A 3/1977

OTHER PUBLICATIONS

Great Britain Search Report for Application No. GB1005549.9, dated Jul. 30, 2010.

(Continued)

*Primary Examiner* — Andrew Smyth
(74) *Attorney, Agent, or Firm* — Bishop Diehl & Lee, Ltd.

(57) ABSTRACT

A method of mounting rods in quadrupole, hexapole, octupole, and other multipole geometries is described. First and second dies are used to hold the rods in the required configuration with the plurality of rods extending through each of the two dies. A coupling arrangement is used to separate the first and second dies, and also prevents motion in the plane of the dies. The rods are seated and retained against individual supports and arranged circumferentially about an intended ion beam axis. The supports are desirably fabricated from silicon bonded to a glass substrate, a support for a first rod being electrically isolated from a support for a second adjacent rod.

29 Claims, 6 Drawing Sheets

(a)

(b)

(56) References Cited

U.S. PATENT DOCUMENTS

| | | | | |
|---|---|---|---|---|
| 2005/0258364 | A1* | 11/2005 | Whitehouse et al. | 250/292 |
| 2006/0232837 | A1* | 10/2006 | Shelef | 359/1 |
| 2006/0272149 | A1* | 12/2006 | Steinberg et al. | 29/834 |
| 2007/0057172 | A1* | 3/2007 | Wang | 250/281 |
| 2008/0191132 | A1* | 8/2008 | Boyle et al. | 250/287 |
| 2009/0026361 | A1 | 1/2009 | Syms et al. | |
| 2009/0090197 | A1 | 4/2009 | Finlay et al. | |
| 2009/0140135 | A1* | 6/2009 | Finlay | 250/281 |
| 2009/0212210 | A1 | 8/2009 | Finlay et al. | |
| 2010/0096541 | A1* | 4/2010 | Okumura et al. | 250/281 |
| 2010/0276588 | A1 | 11/2010 | Syms | |
| 2011/0049360 | A1* | 3/2011 | Schoen | 250/290 |

OTHER PUBLICATIONS

European Search Report for EP Application No. 11159017.0-1232/2372748, dated Jan. 12, 2012.

Extended European Search Report for European Patent Application No. 11159009.7, dated Feb. 14, 2012.

* cited by examiner

MICROENGINEERED MULTIPOLE ROD ASSEMBLY

CROSS-REFERENCE TO RELATED APPLICATIONS

This application claims the benefit of Great Britain Patent Application Serial No. GB1005549.9 filed on Apr. 1, 2010.

TECHNICAL FIELD OF THE INVENTION

The present application relates to microengineered multipole rod assemblies and in particular, a mounting arrangement that provides support for and alignment of a plurality of conducting rods in a multipole configuration. The invention also relates to the use of such multipole configurations in mass spectrometer systems as a mass filter or ion guide.

BACKGROUND OF THE INVENTION

Atmospheric pressure ionisation techniques such as electrospray and chemical ionisation are used to generate ions for analysis by mass spectrometers. Ions created at atmospheric pressure are generally transferred to high vacuum for mass analysis using one or more stages of differential pumping. These intermediate stages are used to pump away most of the gas load. Ideally, as much of the ion current as possible is retained. Typically, this is achieved through the use of ion guides, which confine the trajectories of ions as they transit each stage.

In conventional mass spectrometer systems, which are based on components having dimensions of centimeters and larger, it is known to use various types of ion guide configurations. These include multipole configurations. Such multipole devices are typically formed using conventional machining techniques and materials. Multipole ion guides constructed using conventional techniques generally involve an arrangement in which the rods are drilled and tapped so that they may be held tightly against an outer ceramic support collar using retaining screws. Electrical connections are made via the retaining screws using wire loops that straddle alternate rods. However, as the field radius decreases, and/or the number of rods used to define the multipole increases, problems associated with such conventional techniques include the provision of a secure and accurate mounting arrangement with independent electrical connections. For similar reasons, the provision of a quadrupole configuration for mass filtering applications requires a mounting arrangement that can provide the necessary tolerances and accuracy.

There is, therefore, a need for a means of accurately producing multipole configurations for use in microengineered systems, specifically for use in mass spectrometry applications.

SUMMARY OF THE INVENTION

These and other problems are addressed by a microengineered multipole rod assembly for use as an ion guide or as a mass filter as provided in accordance with the present teaching.

A first embodiment of the application provides a microengineered multipole rod assembly for use as an ion guide or as a mass filter, the assembly comprising at least a first and second substrate coupled together by contact of an arcuate surface through a line or point contact, a plurality of rods; and wherein individual ones of the rods extend through each of the first and second substrates, the rods being supported by each of the first and second substrates.

In another embodiment, microengineered mass spectrometer system comprises a microengineered ion guide comprising a multipole rod assembly, the assembly comprising at least a first and second substrate coupled together by contact of an arcuate surface through a line or point contact, a plurality of rods; and wherein individual ones of the rods extend through each of the first and second substrates, the rods being supported by each of the first and second substrates; and an analyser chamber comprising a mass analyser, wherein the ion guide is operable for directing ions, towards the analyser chamber.

BRIEF DESCRIPTION OF THE DRAWINGS

The present application will now be described with reference to the accompanying drawings in which.

DETAILED DESCRIPTION

Figure 1:
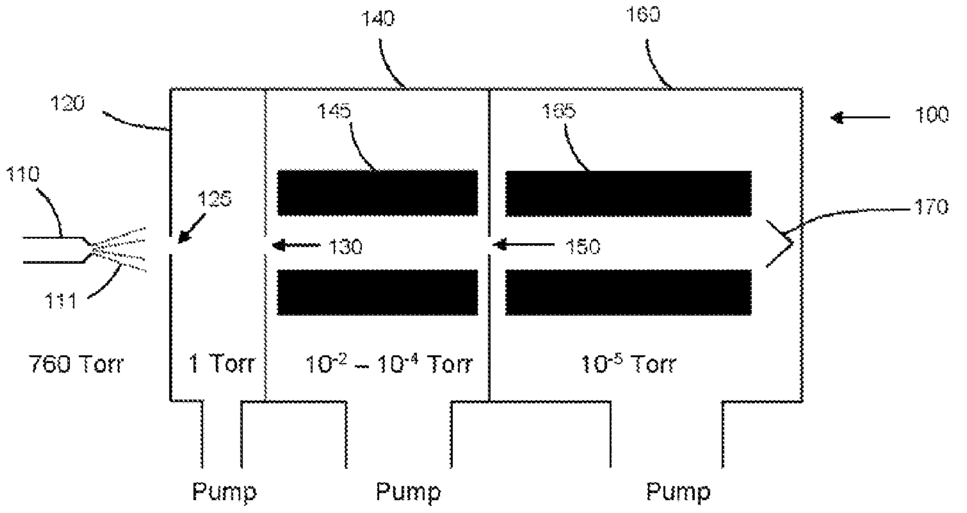
FIG. 1 shows a schematic representation of an exemplary microengineered mass spectrometer system incorporating an ion guide in the second vacuum chamber, in accordance with the present teaching.

FIG. 1 shows in schematic form an example of a mass spectrometer system 100 in accordance with the present teaching. An ion source 110, such as an electrospray ion source, effects generation of ions 111 at atmospheric pressure. In this exemplary arrangement, the ions are directed into a first chamber 120 through a first orifice 125. The pressure in this first transfer chamber is of the order of 1 Torr. A portion of the gas and entrained ions that passes into the first chamber 120 through orifice 125 is sampled by a second orifice 130 and passes into a second chamber 140, which is typically operated at a pressure of $10^{-4}$ to $10^{-2}$ Torr. The second orifice 130 may be presented as an aperture in a flat plate or a cone. Alternatively, a skimmer may be provided proximal to or integrated with the entrance to the second chamber so as to intercept the initial free jet expansion. The second chamber, or ion guide chamber, 140 is coupled via a third orifice 150 to an analysis chamber 160, where the ions may be filtered according to their mass-to-charge (m/z) ratio using, for example, a quadrupole mass filter 165, and then detected using a suitable ion detector 170. It will be appreciated by those of skill in the art that other types of mass analyser, including magnetic sector and time-of-flight analysers, for example, can be used instead of a quadrupole mass filter. It will be understood that the ion guide chamber 140 is an intermediate chamber provided between the atmospheric ion source 110 and the mass analysis chamber 160, albeit downstream in this instance of a first chamber.

The quantity of gas pumped through each vacuum chamber is equal to the product of the pressure and the pumping speed. In order to use pumps of a modest size throughout (the pumping speed is related to the physical size of the pump), it is desirable to pump the majority of the gas load at high pressure and thereby minimise the amount of gas that must be pumped at low pressure. Most of the gas flow through the first orifice 125 is pumped away via the first chamber 120 and second chamber 140, as a result of their relatively high operating pressures, and only a small fraction passes through the third orifice 150 and into the analysis chamber, where a low pressure is required for proper operation of the mass filter 165 and detector 170.

In order to transfer as much of the ion current as possible to the analysis chamber the second chamber includes a multipole ion guide 145, which acts on the ions but has no effect on the unwanted neutral gas molecules. Such an ion guide is provided by a multipole configuration comprising a plurality of individual rods arranged circumferentially about an intended ion path, the rods collectively generating an electric field that confines the trajectories of the ions as they transit the second chamber. The number of rods employed in the multipole configuration determines the nomenclature used to define the configuration. For example, four rods define a quadrupole, six rods define a hexapole and eight rods define an octupole. The voltage applied to each rod is required to oscillate at radio frequency (rf), with the waveforms applied to adjacent rods having opposite phase. Quadrupole mass filters are operated with direct current (dc) components of equal magnitude but opposite polarity added to the out-of-phase rf waveforms. When the magnitude of the dc components is set appropriately, only ions of a particular mass are transmitted. However, the ion guide is operable without such dc components (rf only), and all ions with masses within a range defined by the rf voltage are transmitted.

It will be appreciated that at a first glance, a quadrupole ion guide seems to be somewhat structurally similar to a pre-filter, which is used to minimise the effects of fringing fields at the entrance to a quadrupole mass filter. However, a pre-filter must be placed in close proximity to the mass filtering quadrupole 165 without any intermediate aperture i.e. they do not transfer ions from one vacuum stage to another.

It will be understood that within the second chamber, if the pressure is high enough, collisions with neutral gas molecules cause the ions to lose energy, and their motion can be approximated as damped simple harmonic oscillations (an effect known as collisional focusing). This increases the transmitted ion current as the ions become concentrated along the central axis. It is known that this effect is maximised if the product of the pressure and the length of the ion guide lies between $6\times10^{-2}$ and $15\times10^{-2}$ Torr-cm. It follows that a short ion guide allows the use of higher operating pressures and consequently, smaller pumps.

Figure 2:
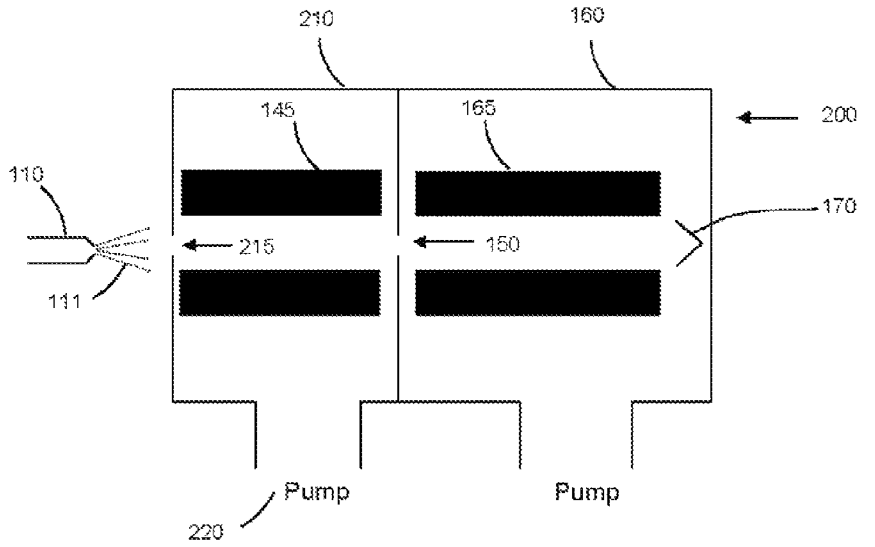
FIG. 2 shows a schematic representation of an exemplary microengineered mass spectrometer system incorporating an ion guide in the first vacuum chamber, in accordance with the present teaching.

FIG. 2 shows in schematic form a second example of a mass spectrometer system 200 in accordance with the present teaching. In this arrangement there are only two vacuum chambers and the multipole ion guide 145 acts on the ions directly after they pass through the first orifice 215. It is again accommodated in an intermediate chamber 210 between the ion source 110 and the vacuum chamber 160 within which the mass analyser 165 is provided. The size of the first orifice 215, the second orifice 150, and the pump 220 are chosen to limit the gas flow into the analysis chamber 160.

In accordance with the present teaching, the multipole ion guide that provides confinement and focusing of the ions has critical dimensions similar to that of the microengineered quadrupole mass filter provided within the analysis chamber. As both the ion guide and the mass filter are of a small scale, they may be accommodated in vacuum chambers that are smaller than those used in conventional systems. In addition, the pumps may also be smaller, as the operating pressures tolerated by these components are higher than those used in conventional systems.

Figure 3:
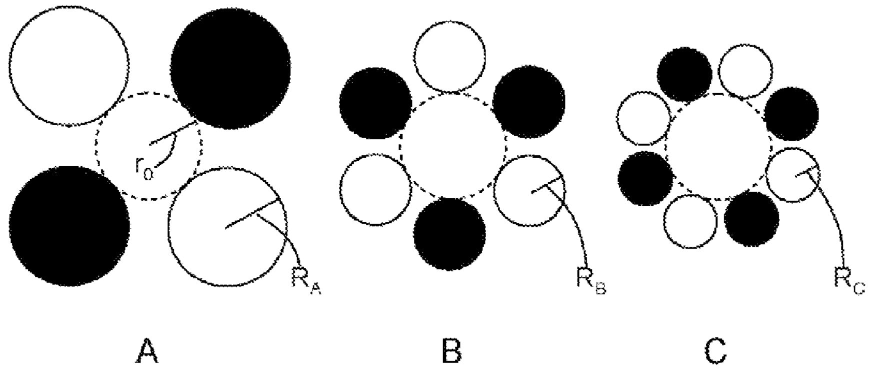
FIG. 3 shows how with increasing number of rods within a multipole geometry the radius of the individual rods may decrease.

It is reasonable to consider a fixed field radius, $r_0$, which might be determined, for example, by the diameter of the second orifice 130 in FIG. 1, or the radial extent of the free jet expansion emanating from the first orifice 215 in FIG. 2. In FIG. 3, it can be seen that as more rods are used to define the multipole, the radius of each rod, R, becomes smaller such that $R_C$ in the octupole configuration (FIG. 3C) is smaller than $R_B$ in the hexapole configuration (FIG. 3B), which is smaller than $R_A$ in the quadrupole configuration (FIG. 3A). As the rf waveforms applied to adjacent rods must have opposite phase, electrical connections to the rods are made in two sets (indicated by the black and white circles in FIG. 3). Microengineering techniques provide a means of accurately forming independent sets of rod mounts with the required electrical connections.

Figure 4:
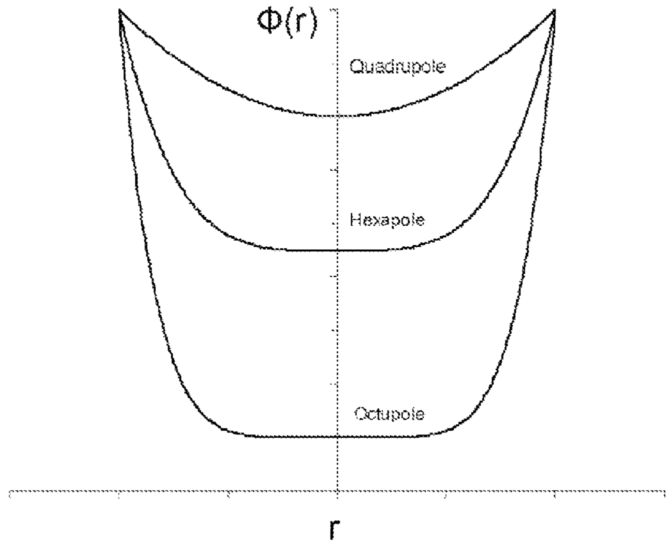
FIG. 4 shows pseudopotential wells for each of a quadrupole, hexapole and octupole geometry.

Although the electric field within the multipole ion guide oscillates rapidly in response to the rf waveforms applied to the rods, the ions move as if they are trapped within a potential well. The trapping pseudopotentials can be described using $$\Phi(r) = \frac{n^2 z^2 V_0^2}{4m\Omega^2 r_0^2}\left(\frac{r}{r_0}\right)^{2n-2}$$

where 2n is the number of poles, r is the radial distance from the centre of the field, $r_0$ is the inscribed radius, $V_0$ is the rf amplitude, z is the charge, Ω is the rf frequency, and m is the mass of the ion [D. Gerlich, J. Anal. At. Spectrom. 2004, 19, 581-90]. The required pseudopotential well depth is dictated by the need to confine the radial motion of the ions, and should be at least equal to the maximum radial energy. It follows that miniaturisation, which leads to a reduction in the inscribed radius, results in a reduction in the required rf amplitude. FIG. 4 shows how the potential, Φ(r), generated by quadrupole, hexapole, and octupole geometries varies with the radial distance from the centre of the field, with the same mass, charge, inscribed radius and rf amplitude used in each case. It can be seen that the pseudopotential well established by a hexapole or an octupole is much deeper and has a flatter minimum than the pseudopotential well established by a quadrupole. Compared with quadrupole ion guides, hexapole and octupole ion guides can retain higher mass ions for a given rf amplitude, or alternatively, require smaller rf amplitudes to establish a particular pseudopotential well depth. Octupoles and, to a lesser extent, hexapoles can accommodate more low energy ions than quadrupoles by virtue of their flatter minima, but the absence of any restoring force near their central axes limits their ability to focus the ion beam. Hexapole ion guides may offer the best compromise between ion capacity and beam diameter.

In summary, advantages of employing a miniature multipole ion guide include:

(i) The overall size of this component is consistent with a miniature mass spectrometer system in which other components are also miniaturised.

(ii) The rf amplitude required to establish a particular pseudopotential well depth is reduced. This increases the range of pressures that can be accessed without initiation of an electrical discharge. In this respect, hexapoles and octupoles are advantageous over quadrupoles.

(iii) A higher pressure may be tolerated if the ion guide is short. Consequently, smaller pumps can be used, which allows the overall instrument dimensions to be reduced.

Figure 5:
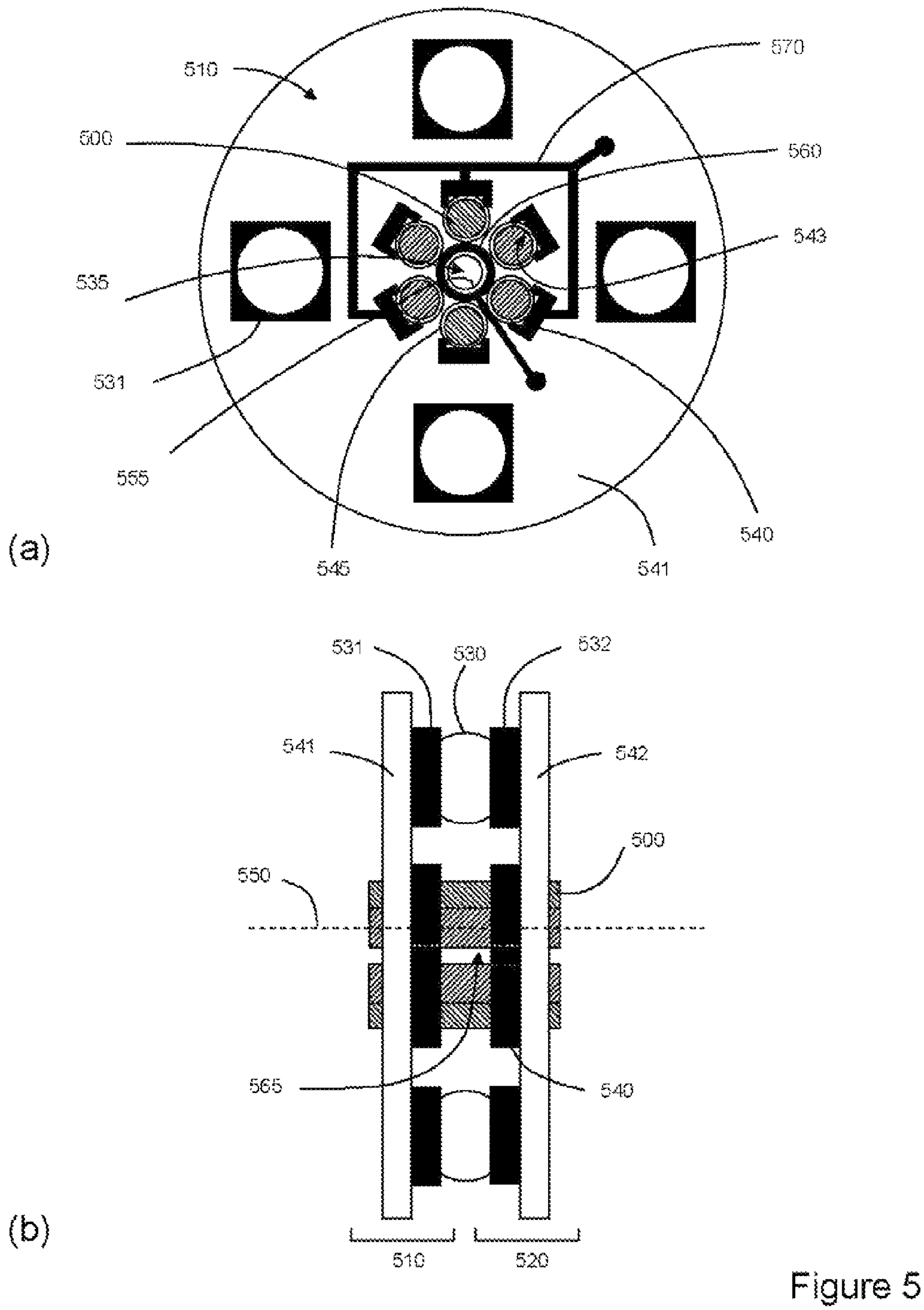
FIG. 5 shows an exemplary hexapole mounting arrangement incorporating an integral lens as viewed (a) along the longitudinal axis of the ion guide, and (b) from the side.

FIG. 5 shows an exemplary mounting arrangement for such a multipole configuration, specifically a hexapole arrangement. Within the context of microengineering, it will be appreciated that some form of etch or other silicon processing technique will typically be required to fabricate the structure. In this arrangement, six individual rods 500 are held in the required configuration using first 510 and second 520 dies, with the plurality of rods extending through each of the two dies. In this exemplary arrangement the first and second dies are separated from one another using one or more precision spacers such as, for example, a ball 530 held in two sockets 531, 532 provided on the opposing dies. In the arrangement of FIG. 5, four such spacers are provided, equally spaced about the dies so as to ensure that once located relative to one another, each of the two dies will maintain their relative positioning and will not rock or move relative to one another. It will be appreciated that this ball and socket coupling is representative of a preferred coupling that can be usefully employed within the context of the present teaching.

In this exemplary application, the configuration is used as an ion guide. The rods are operably used to generate an electric field and as such are conductors. These may be formed by solid metal elements or by some composite structure such as a metal coated insulated core. The rods are seated and retained against individual supports 540, and arranged circumferentially about an intended ion beam axis 535. The supports are desirably fabricated from silicon bonded to a glass substrate 541, 542, a support for a first rod being electrically isolated from a support for a second adjacent rod. Each of the supports may differ geometrically from others of the supports. Desirably, however, two or more supports are geometrically the same.

In this mounting arrangement, the rods extend through the substrate such that they have a longitudinal axis substantially perpendicular to the plane of the substrate. At least one aperture is provided through each substrate to facilitate a passing of a rod from one side through to the other side. In the arrangement of FIG. 5, a plurality of apertures 545 is provided. Each of the apertures 545 is associated with an individual rod 500. The bore or diameter of the apertures is at least as large as that of the rod such that the rod can freely pass through the substrate. It will be appreciated that while provision of a single aperture per rod may be employed in certain configurations, in other configurations (such as will be described with reference to FIG. 6) two or more rods may occupy the same aperture.

After passing a rod through the first substrate 541 and the second substrate 542, the rod 500 is located and secured by a coupling to its supports 540. Consequently, each rod is supported at two positions along its length. In the exemplary arrangement of FIG. 5, the supports 540 are formed from etched silicon having a contoured engagement surface 543, which on presentation of a rod thereto couples with the rod to secure it in place.

The configuration can be described as out-of-plane when the rods are orientated such that the longitudinal axis 550 of each of the rods is substantially transverse to the surfaces of the first 510 and second 520 dies. It will be appreciated that, by providing the plurality of rods in an out-of-plane configuration relative to their supporting substrate, identical supports can be used for each of the rods as the mutual spacing of the rods is achieved by their radial orientation relative to one another. This orientation of the rods about a common ion beam axis may be provided in a plurality of configurations or geometries allowing for the use of multiple individual rods.

An aperture 555 centered on the intended beam axis 535 is provided on each of the dies to let ions into and out of the multipole ion guide. In addition, integral ring electrodes 560 also provided on each of the dies may be used to effect trapping of ions within the volume 565 defined by the multipole arrangement of rods. The electrodes may be formed by metal deposition using a suitable mask, or by selective etching of silicon in the case of a bonded silicon-on-glass substrate. During operation, the bias applied to these electrodes is initially set equal to the rod bias, and ions pass freely through the multipole ion guide. An axial trapping potential is subsequently generated by simultaneously setting the electrode bias more positive (in the case of positive ions) or more negative (in the case of negative ions) than the rod bias. The ions become trapped within the multipole until either or both of the electrode biases are returned to their starting value.

Each of the rods requires an electrical connection. This is conveniently achieved using integrated conductive tracks as indicated in FIG. 5. The tracks 570 are formed by metal deposition using a suitable mask, or by selective etching of silicon in the case of a bonded silicon-on-glass substrate. The multipole ion guide may be assembled using two identical dies. However, when the second die is presented to the first, it must be rotated through 180° in order that three rods are connected by the tracks on the first die, while the remaining three rods are connected by the tracks on the second die.

Figure 6:
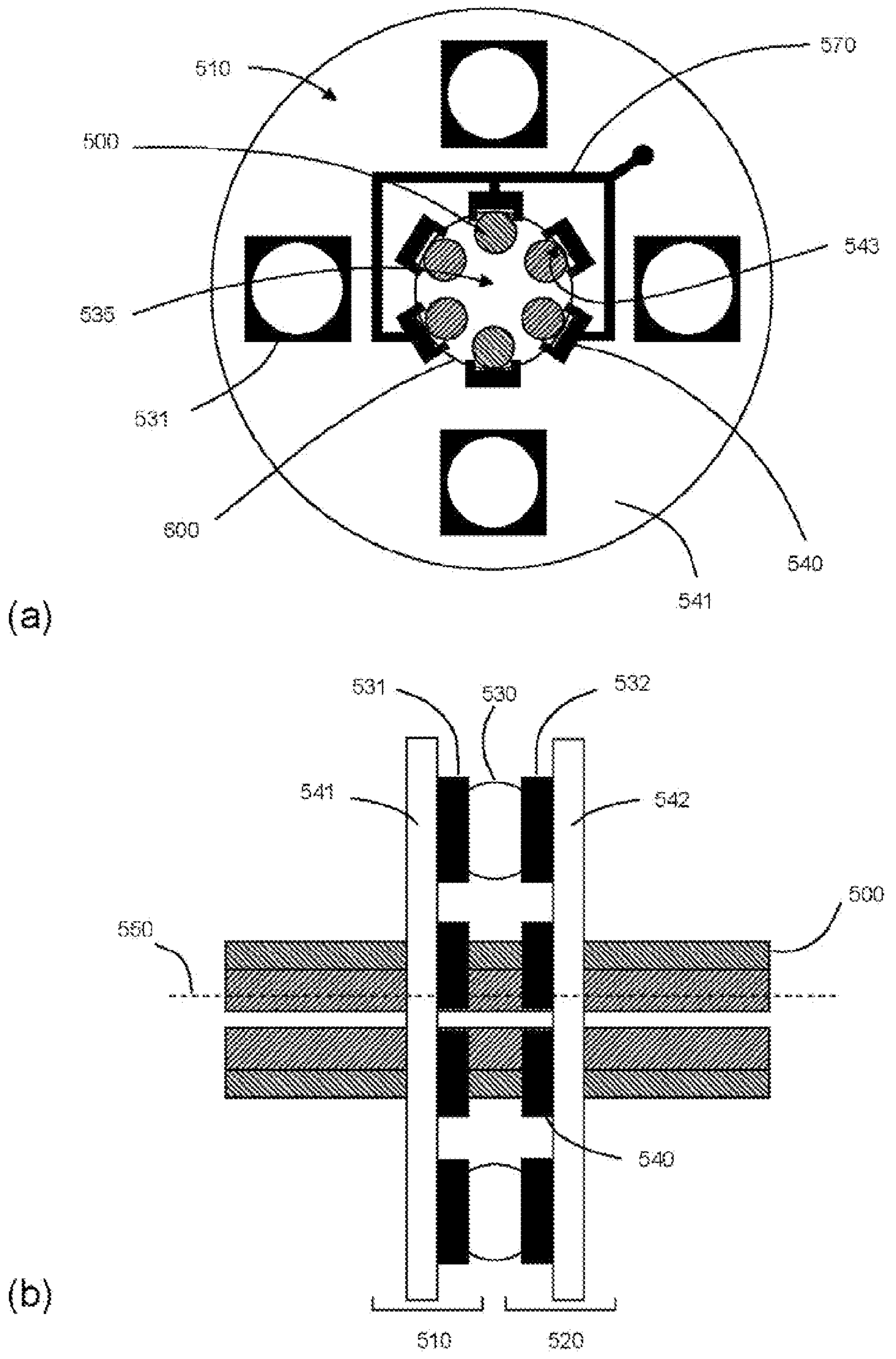
FIG. 6 shows a further exemplary hexapole mounting arrangement as viewed (a) along the longitudinal axis of the ion guide, and (b) from the side.

It will be appreciated that using a configuration such as shown in FIG. 5 provides for generation of a multipole field only between the two dies. FIG. 6 shows a further exemplary hexapole mounting arrangement in which there is no integral electrode, and the central aperture 600 has been made bigger, such that all the rods 500 are located within it. The same reference numerals have been used for similar components. The advantage of this design is that the multipole field is not perturbed by the presence of structures within the inscribed circle defined by the rods. As a result, the field generated along the entire length of the rods, which may now be longer, can be used to confine the trajectories of ions.

Figure 7:
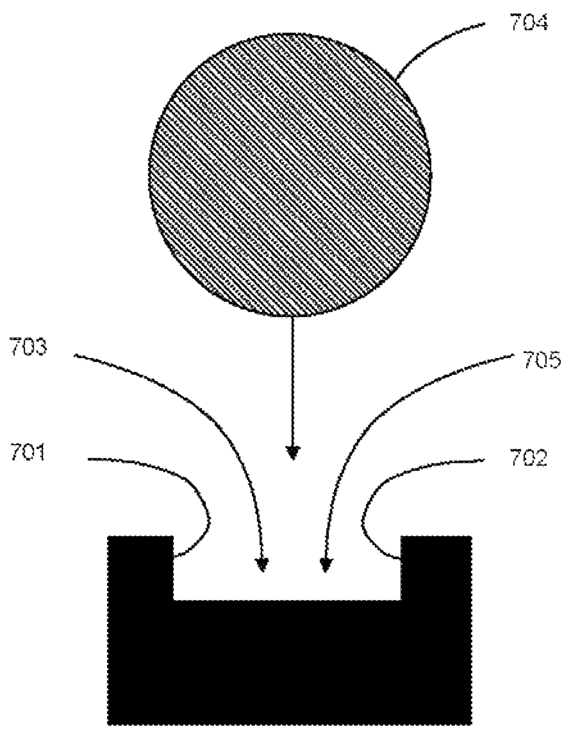
FIG. 7 shows in more detail the individual mounts of FIGS. 5 and 6.

FIG. 7 shows in more detail one of the engagement surfaces that may be provided to seat and secure a rod. The mount employs first 701 and second 702 walls defining a channel 703 therebetween within which a rod 704 is located. The rod on presentation to this trench is located by both the first and second walls. As the rods are not typically resting on the supports through the action of gravity thereon, it is desirable that some form of bond or securing means such as an adhesive 705, for example, is used to retain the rods. This adhesive is desirably of the type providing electrical conduction so as to allow a making of electrical connections between the supports and the rods.

Figure 8:
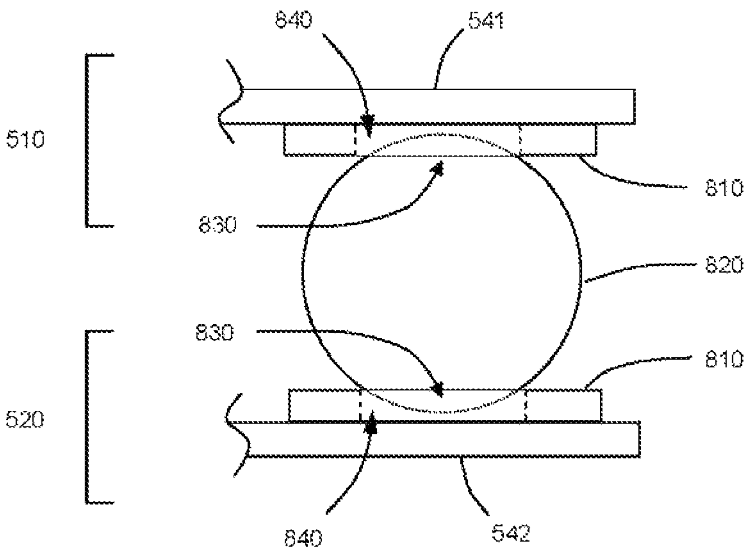
FIG. 8 shows an exemplary precision spacer that maintains the correct separation and registry between the two dies.

An exemplary precision spacer that maintains the correct separation and registry between the two dies is shown in FIG. 8. A ball 820 seated in sockets 830 determines the separation between the dies 510, 520, and prevents motion in the plane of the dies. The ball can be made from ruby, sapphire, aluminum nitride, stainless steel, or any other material that can be prepared with the required precision. The sockets are formed by etching of the pads 810 bonded to the substrates 541, 542, such that a cylindrical core is removed from their centers. Adhesive may be deposited in the voids 840 to secure the balls and make the assembled structure rigid.

In general, a component in an assembly has three orthogonal linear and three orthogonal rotational degrees of freedom relative to a second component. It is the purpose of a coupling to constrain these degrees of freedom. In mechanics, a coupling is described as kinematic if exactly six point contacts are used to constrain motion associated with the six degrees of freedom. These point contacts are typically defined by spheres or spherical surfaces in contact with either flat plates or v-grooves. A complete kinematic mount requires that the point contacts are positioned such that each of the orthogonal degrees of freedom is fully constrained. If there are any additional point contacts, they are redundant, and the mount is not accurately described as being kinematic. However, the terms kinematic and quasi-kinematic are often used to describe mounts that are somewhat over-constrained, particularly those incorporating one or more line contacts. Line contacts are generally defined by arcuate or non-planar surfaces, such as those provided by circular rods, in contact with planar surfaces, such as those provided by flat plates or v-grooves. Alternatively, an annular line contact is defined by a sphere in contact with a cone or a circular aperture.

A dowel pin inserted into a drilled hole is a common example of a coupling that is not described as kinematic or quasi-kinematic. This type of coupling is usually referred to as an interference fit. A certain amount of play or slop must be incorporated to allow the dowel pin to be inserted freely into the hole during assembly. There will be multiple contact points between the surface of the pin and the side wall of the mating hole, which will be determined by machining inaccuracies. Hence, the final geometry represents an average of all these ill-defined contacts, which will differ between nominally identical assemblies.

Desirably, the precision spacers defining the mutual separation of the two dies in FIG. 5 also serve to provide a coupling between the two dies that is characteristic of a kinematic or quasi-kinematic coupling, in that the engagement surfaces define line or point contacts. It will be appreciated that the ball and socket arrangement is representative of such a preferred coupling that can be usefully employed within the context of the present teaching. In the case of a ball and socket, an annular line contact is defined when the components engage. However, it will be understood that other arrangements characteristic of kinematic or quasi-kinematic couplings are also suitable. These include, but are not limited to arrangements in which point contacts are defined by spherical elements in contact with plates or grooves, or arrangements in which line contacts are defined by cylindrical components in contact with plates or grooves.

It will be understood that the mounting arrangements described herein are exemplary of the type of configurations that could be employed in fabrication of a microengineered ion guide using six individual rods. It will also be apparent to the person of skill in the art that other arrangements of 8, 10, 12, 14, etc. rods can be accommodated by simple extension of the above designs. Moreover, odd numbers of rods can be accommodated by providing the appropriate number of mounts on each of the dies to support the rods.

It will be understood that exemplary methods of mounting rods in quadrupole, hexapole, octupole, and other multipole geometries are described. Assemblies fabricated using such methods provide first and second dies or substrates which are used to hold the rods in the required configuration, with the plurality of rods extending through each of the two dies. A kinematic coupling arrangement is used to separate and couple the first and second dies, and also prevents motion in the plane of the dies. The rods are seated and retained against individual supports and arranged circumferentially about an intended ion beam axis. The supports are desirably fabricated from silicon bonded to a glass substrate, a support for a first rod being electrically isolated from a support for a second adjacent rod.

While the present teaching has been described heretofore with respect to use of multipole rod configurations in ion guide applications, it will be appreciated by those of skill in the art that such support geometries could also be used for fabrication of quadrupole configurations for use in mass filtering. While the specifics of the mass spectrometer have not been described herein, a miniature instrument such as that described herein may be advantageously manufactured using microengineered instruments such as those described in one or more of the following co-assigned US applications: U.S. patent application Ser. No. 12/380,002, U.S. patent application Ser. No. 12/220,321, U.S. patent application Ser. No. 12/284,778, U.S. patent application Ser. No. 12/001,796, U.S. patent application Ser. No. 11/810,052, U.S. patent application Ser. No. 11/711,142 the contents of which are incorporated herein by way of reference. As has been exemplified above with reference to silicon etching techniques, within the context of the present invention, the term microengineered or microengineering or microfabricated or microfabrication is intended to define the fabrication of three dimensional structures and devices with dimensions in the order of millimeters or sub-millimeter scale.

Where done at the micrometer scale, it combines the technologies of microelectronics and micromachining. Microelectronics allows the fabrication of integrated circuits from silicon wafers whereas micromachining is the production of three-dimensional structures, primarily from silicon wafers. This may be achieved by removal of material from the wafer or addition of material on or in the wafer. The attractions of microengineering may be summarised as batch fabrication of devices leading to reduced production costs, miniaturisation resulting in materials savings, miniaturisation resulting in faster response times and reduced device invasiveness. It will be appreciated that within this context the term "die" as used herein may be considered analogous to the term as used in the integrated circuit environment as being a small block of semiconducting material, on which a given functional circuit is fabricated. In the context of integrated circuits fabrication, large batches of individual circuits are fabricated on a single wafer of a semiconducting material through processes such as photolithography. The wafer is then diced into many pieces, each containing one copy of the circuit. Each of these pieces is called a die. Within the present context such a definition is also useful but it is not intended to limit the term to any one particular material or construct in that different materials could be used as supporting structures or substrates for the rods of the present teaching without departing from the scope herein defined.

Wide varieties of techniques exist for the microengineering of wafers, and will be well known to the person skilled in the art. The techniques may be divided into those related to the removal of material and those pertaining to the deposition or addition of material to the wafer. Examples of the former include:

Wet chemical etching (anisotropic and isotropic)
Electrochemical or photo assisted electrochemical etching
Dry plasma or reactive ion etching
Ion beam milling
Laser machining
Excimer laser machining
Electrical discharge machining Whereas examples of the latter include:

Evaporation

Thick film deposition
Sputtering
Electroplating
Electroforming
Moulding
Chemical vapour deposition (CVD)
Epitaxy While exemplary arrangements have been described herein to assist in an understanding of the present teaching it will be understood that modifications can be made without departing from the spirit and or scope of the present teaching. To that end it will be understood that the present teaching should be construed as limited only insofar as is deemed necessary in the light of the claims that follow.

Furthermore, the words comprises/comprising when used in this specification are to specify the presence of stated features, integers, steps or components but does not preclude the presence or addition of one or more other features, integers, steps, components or groups thereof.

What is claimed is:

1. A microengineered multipole rod assembly for use as an ion guide or as a mass filter, the assembly comprising:
a plurality of rods;
at least a first and second substrate, each of the first and second substrate supporting all of the rods on individual support elements provided for each of the supported rods, the first and second substrates being coupled together, independently of the plurality of rods, by contact of an arcuate surface through a line or point contact, the contact of the arcuate surface through the line or point contact providing a kinematic coupling between each of the first and second substrates; and
wherein individual ones of the rods extend through each of the first and second substrates.

2. The assembly of claim 1 wherein the rods are arranged in pairs with a first pair of rods being electrically isolated from a second pair of rods.

3. The assembly of claim 1 wherein each of the support elements comprises a contoured engagement surface, which on presentation of a rod thereto couples with the rod to secure it in place.

4. The assembly of claim 3 wherein the engagement surface is parallel with the longitudinal axis of the rod.

5. The assembly of claim 1 wherein the support element is fabricated from silicon bonded to a glass substrate.

6. The assembly of claim 5 wherein the support element provides a first and second contact surface for contacting against a supported rod.

7. The assembly of claim 6 wherein the first and second contact surfaces are substantially perpendicular to one another.

8. The assembly of claim 1 wherein the first and second substrates are spaced apart by a ball and socket coupling arrangement.

9. The assembly of claim 1 wherein the plurality of rods are circumferentially arranged about a common ion beam axis.

10. The assembly of claim 9 comprising an ion beam lens centered on the ion beam axis.

11. The assembly of claim 1 wherein the substrates comprise a plurality of apertures, individual apertures providing a passage through the respective substrate for individual ones of the rods.

12. The assembly of claim 1 wherein the each of the substrates define a shared aperture providing a passage through the respective substrates for a plurality of rods.

13. The assembly of claim 1 wherein the substrates are silicon-on-glass structures.

14. The assembly of claim 13 wherein the rods are supported on etched silicon components of the substrates.

15. The assembly of claim 14 wherein the rods are secured to the etched silicon components using an adhesive.

16. The assembly of claim 1 wherein the first and second substrates define a sandwich structure with support elements for the rods provided as part of the sandwich structure.

17. The assembly of claim 1 wherein at least one of the substrates is configured to provide one or more electrical paths to individual ones of the rods.

18. The assembly of claim 1 configured as an ion guide.

19. The assembly of claim 1 wherein the contact of the arcuate surface through the line or point contact is a consequence of contact with a flat surface, v-groove, surfaces defining an aperture, or a cone.

20. The assembly of claim 19 wherein the contact of the arcuate surface with the flat surface, v-groove, surfaces defining the aperture, or cone is characteristic of a kinematic or quasi-kinematic coupling.

21. The assembly of claim 1 configured as a mass analyser.

22. A microengineered mass spectrometer system comprising:
a microengineered multipole rod assembly for use as an ion guide or as a mass filter, the assembly comprising:
a plurality of rods;
at least a first and second substrate, each of the first and second substrate supporting all of the rods on individual support elements provided for each of the supported rods, the first and second substrates being coupled together, independently of the plurality of rods, by contact of an arcuate surface through a line or point contact, the contact of the arcuate surface through the line or point contact providing a kinematic coupling between each of the first and second substrates; and
wherein individual ones of the rods extend through each of the first and second substrates.

23. A microengineered mass spectrometer system comprising:
a) a microengineered multipole rod assembly for use as an ion guide or as a mass filter, the assembly comprising:
a plurality of rods;
at least a first and second substrate, each of the first and second substrate supporting all of the rods on individual support elements provided for each of the supported rods, the first and second substrates being coupled together, independently of the plurality of rods, by contact of an arcuate surface through a line or point contact, the contact of the arcuate surface through the line or point contact providing a kinematic coupling between each of the first and second substrates; and
wherein individual ones of the rods extend through each of the first and second substrates; and
b) an analyser chamber comprising a mass analyser,
wherein the ion guide is operable for directing ions, towards the analyser chamber.

24. The system of claim 23 wherein the number of rods defining the ion guide is at least four.

25. The system of claim 23 further comprising an ion guide chamber provided between a first analyser chamber and a second analyser chamber, wherein the ion guide is operable for storing ions and retaining fragment ions, as well as directing ions towards the second analyser chamber.

26. The system of claim 23 wherein the analyser chamber is operable at vacuum conditions and the ion guide is provided in a chamber operable at a pressure intermediate the vacuum conditions and atmosphere.

27. The system of claim 23 wherein the ion guide and mass analyser share a common ion beam axis, the ion guide operably effecting a collisional focusing of the ions prior to their transmission into the analyser chamber.

28. The system of claim 23 wherein the mass analyser comprises a microengineered multipole rod assembly, the assembly comprising:

at least a first and second substrate coupled together by contact of an arcuate surface through a line or point contact;

a plurality of rods; and wherein individual ones of the rods extend through each of the first and second substrates, the rods being supported by each of the first and second substrates.

29. The system of claim 23 wherein the plurality of rods defines a quadrupole or a hexapole, or an octupole.

* * * * *